United States Patent
Flemming et al.

(10) Patent No.: US 7,711,905 B2
(45) Date of Patent: May 4, 2010

(54) METHOD AND SYSTEM FOR USING UPPER CACHE HISTORY INFORMATION TO IMPROVE LOWER CACHE DATA REPLACEMENT

(75) Inventors: Diane Garza Flemming, Pflugerville, TX (US); Octavian Florin Herescu, Austin, TX (US); William A. Maron, Austin, TX (US); Mysore Sathyanarayana Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 11/778,398

(22) Filed: Jul. 16, 2007

(65) Prior Publication Data

US 2009/0024800 A1 Jan. 22, 2009

(51) Int. Cl.
*G06F 12/00* (2006.01)
(52) U.S. Cl. .................................... 711/136
(58) Field of Classification Search ........................ None
See application file for complete search history.

(56) References Cited

U.S. PATENT DOCUMENTS 6,542,967 B1 * 4/2003 Major ........................ 711/134

| | | | |
|---|---|---|---|
| 7,310,707 B2 * | 12/2007 | Olds et al. ................. | 711/133 |
| 2005/0283573 A1 | 12/2005 | Mewhinney et al. | |
| 2006/0282620 A1 | 12/2006 | Kashyap et al. | |
| 2007/0038809 A1 | 2/2007 | Accapadi et al. | |

OTHER PUBLICATIONS

U.S. Appl. No. 11/439,894, filed Oct. 10, 2006, Maron et al.
U.S. Appl. No. 11/539,889, filed Oct. 10, 2006, Maron et al.
"Enhancing the accuracy of LRU replacement mechanism for the secondary and tertiary (and all next) levels of cache", IBM, IPCOM000127768D, Sep. 13, 2005, pp. 1-2.
Ekanadham et al., "Realizing an L2 as an Extension of an L1", IBM Technical Disclosure Bulletin, vol. 36, No. 12, Dec. 1993, pp. 143-144.

* cited by examiner

*Primary Examiner*—Hiep T Nguyen
(74) *Attorney, Agent, or Firm*—Yee & Associates, P.C.; Matthew W. Baca (57) ABSTRACT

A system for managing data in a plurality of storage locations. In response to a least recently used algorithm wanting to move data from a cache to a storage location, an aging table is searched for an associated entry for the data. In response to finding the associated entry for the data in the aging table, an indicator is enabled on the data. In response to determining that the indicator is enabled on the data, the data is kept in the cache despite the least recently used algorithm wanting to move the data to the storage location.

20 Claims, 7 Drawing Sheets

METHOD AND SYSTEM FOR USING UPPER CACHE HISTORY INFORMATION TO IMPROVE LOWER CACHE DATA REPLACEMENT

BACKGROUND OF THE INVENTION

1. Field of the Invention

The present invention relates generally to an improved data processing system and in particular to a method and system for processing data. Still more particularly, the present invention is directed to a computer implemented method, system, and computer usable program code for managing data in a cache.

2. Description of the Related Art

A cache is a section of memory that stores frequently used data by a processor. Typically, the processor uses the cache to reduce time required to access data from main memory. In other words, the cache is a memory bank that bridges main memory and the processor. The cache is faster, or has a reduced latency, than main memory and allows the processor to execute instructions and read and write data at higher speeds. However, the cache is small compared to the main memory, so space is at a premium. Instructions and data are transferred from main memory to the cache in lines or blocks, possibly using some kind of look-ahead algorithm.

A level 1 (L1) cache is a memory bank, such as processor registers, built into the processor chip. The L1, or primary cache, is the memory closest to the processor, itself. A level 2 (L2) cache is a secondary staging area that feeds the L1 cache. The L2 cache may also be built into the processor chip or may reside on a separate chip on the motherboard. If the L2 cache is built into the processor chip, then a cache on the motherboard may be a Level 3 (L3) cache. The L3 cache feeds the L2 cache, which feeds the L1 cache, which feeds the processor. In addition, the L1 cache is faster than the L2 cache, which is faster than the L3 cache, which is faster than main memory. In other words, the latency increases as the memory hierarchy moves away from the processor. So, keeping "hot" data close to the processor is a desirable condition.

When a processor needs data from main memory, the needed data is brought into the L2 cache. If the processor does not reference that data for a certain amount of time, a cache replacement mechanism moves that data out of the L2 cache into the L3 cache. If the processor again needs that data, then that data is moved back into the L2 cache from the L3 cache. On the other hand, if that data is not referenced in the L3 cache for a certain amount of time, then that data is moved out of the L3 cache back into main memory.

The Least Recently Used (LRU) algorithm is widely employed for data management in a cache. The LRU algorithm replaces a cache line in the cache that the processor has not referenced or accessed for the longest period of time. The LRU algorithm is based on an observation that cache lines, which the processor referenced in the recent past, will most likely be referenced again in the near future.

Currently, when a cache line is removed from the L2 cache, the cache line is moved to the L3 cache and is given the highest ranking in the L3 cache by the LRU algorithm because the cache line is the newest referenced entry in the L3 cache. However, a drawback with this current cache line ranking method is that it only takes into account that the removed cache line is the least recently used among the set of cache lines presently in the L2 cache. This current cache line ranking method does not take into account that during the time the removed cache line was resident in the L2 cache, the processor may have accessed that cache line more frequently than many of the other L2 cache lines. In other words, in terms of performance that cache line was "hot," but because the processor did not recently access that cache line in the L2 cache, that cache line is moved out to the L3 cache.

Removal of this once hot cache line from the L2 cache, and possibly from the L3 cache as well, may be due to the fact that many new memory references pushed that cache line out of the limited cache space. When the processor makes many new memory references, this once hot cache line falls victim to the LRU algorithm. The LRU algorithm pushes the once hot cache line out of the L2 and L3 caches to make room for these new entries. However, the processor may reference these new entries only once and then may again need to access the once hot cache line.

Therefore, it would be beneficial to have a computer implemented method, system, and computer usable program code for preserving a hot cache line in a lower level cache using an improved ranking mechanism to efficiently make use of premium cache space, while reducing latency.

SUMMARY OF THE INVENTION

Illustrative embodiments provide a computer implemented method, system, and computer usable program code for managing data in a plurality of storage locations. In response to a least recently used algorithm wanting to move data from a cache to a storage location, an aging table is searched for an associated entry for the data. In response to finding the associated entry for the data in the aging table, an indicator is enabled on the data. In response to determining that the indicator is enabled on the data, the data is kept in the cache despite the least recently used algorithm wanting to move the data to the storage location.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
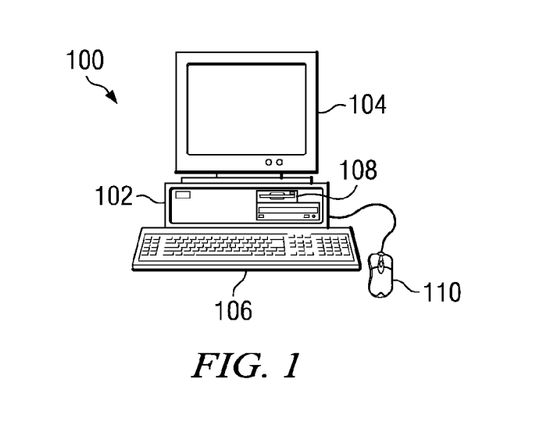
FIG. 1 is a pictorial representation of a data processing system in which illustrative embodiments may be implemented.
Figure 2:
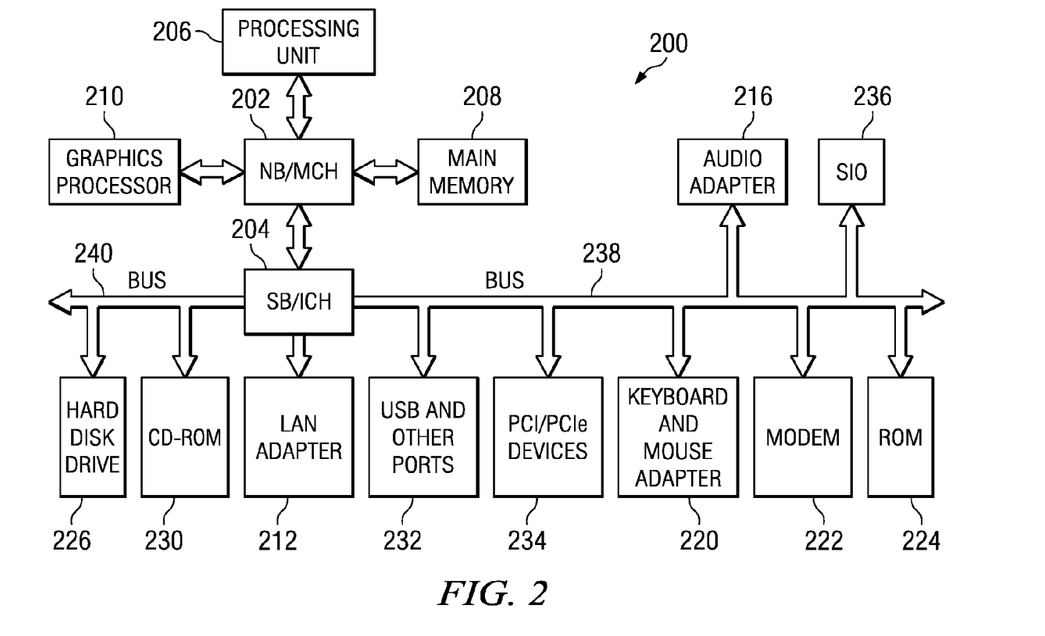
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a data processing system in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with computer 100. Examples of additional input devices may include, for example, a joystick, a touchpad, a touch screen, a trackball, and a microphone.

Computer 100 may be any suitable computer, such as an IBM® eServer™ computer or an IntelliStation® computer which are products of International Business Machines Corporation, located in Armonk, N.Y. Although the depicted representation shows a personal computer, other embodiments may be implemented in other types of data processing systems. For example, other embodiments may be implemented in a network computer, a data storage device, or any other data processing system that includes a plurality of memory caches for data. Computer 100 also preferably includes a graphical user interface (GUI) that may be implemented by means of systems software residing in computer readable media in operation within computer 100.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to NB/MCH 202. Processing unit 206 may contain one or more processors and even may be implemented using one or more heterogeneous processor systems. Graphics processor 210 may be coupled to NB/MCH 202 through an accelerated graphics port (AGP), for example.

In the depicted example, local area network (LAN) adapter 212 is coupled to SB/ICH 204, audio adapter 216, keyboard and mouse adapter 220, modem 222, read only memory (ROM) 224, universal serial bus (USB) and other ports 232. PCI/PCIe devices 234 are also coupled to SB/ICH 204 through bus 238. Hard disk drive (HDD) 226 and CD-ROM 230 are coupled to SB/ICH 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). HDD 226 and CD-ROM 230 may use, for example, an integrated drive electronics (IDE) or serial advanced technology attachment (SATA) interface. A super I/O (SIO) device 236 may be coupled to SB/ICH 204.

An OS runs on processing unit 206. This OS coordinates and controls various components within data processing system 200 in FIG. 2. The OS may be a commercially available OS, such as Microsoft® Windows XP®. Microsoft® and Windows XP® are trademarks of Microsoft Corporation in the United States, other countries, or both. Alternatively, the OS may, for example, be an advanced interactive executive (AIX®) OS, which is a product available from the IBM® Corporation. An object oriented programming system, such as the Java™ programming system, may run in conjunction with the OS and provides calls to the OS from Java™ programs or applications executing on data processing system 200. Java™ and all Java™-based trademarks are trademarks of Sun Microsystems, Inc. in the United States, other countries, or both.

Instructions for the OS, the object-oriented programming system, and applications or programs are located on storage devices, such as HDD 226. These instructions and may be loaded into main memory 208 for execution by processing unit 206. The processes of the illustrative embodiments may be performed by processing unit 206 using computer implemented instructions, which may be located in a memory. An example of a memory is main memory 208, ROM 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 may be varied from the illustrative examples shown. In some illustrative examples, data processing system 200 may be a personal digital assistant (PDA). A personal digital assistant generally is configured with flash memory to provide a non-volatile memory for storing OS files and/or user-generated data. Additionally, data processing system 200 may be a tablet computer, laptop computer, or telephone device.

Other components shown in FIG. 2 may be varied from the illustrative examples shown. For example, a bus system may be comprised of one or more buses, such as a system bus, an I/O bus, and a PCI bus. Of course, the bus system may be implemented using any suitable type of communications fabric or architecture that provides for a transfer of data between different components or devices attached to the fabric or architecture. Additionally, a communications unit may include one or more devices used to transmit and receive data, such as modem 222 or LAN network adapter 212. Further, a memory may be, for example, main memory 208 or a cache such as found in NB/MCH 202. Also, a processing unit may include one or more processors or CPUs. Moreover, illustrative embodiments may be implemented in a logically partitioned data processing system.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

Illustrative embodiments provide a computer implemented method, system, and computer usable program code for managing data in a plurality of storage locations. A storage location is a place where data may be temporarily or permanently stored. In response to a least recently used algorithm in a cache controller wanting to move data, such as a cache line, from a cache to a storage location, such as a lower level cache or a main memory, the cache controller searches an aging table for an associated entry for the cache line. In response to finding the associated entry for the cache line in the aging table, the cache controller enables an indicator, such as, for example, a special bit, on the cache line. Then, in response to determining that the indicator is enabled on the cache line, the cache controller keeps the cache line in the cache despite the least recently used algorithm wanting to move the cache line to the storage location. However, in response to determining that the indicator is disabled on the cache line, the cache controller moves the cache line from the cache to the storage location.

In response to moving the cache line from a higher level cache to the cache, the cache controller searches a reference table for an associated entry for the moved cache line. In response to finding the associated entry for the moved cache line in the reference table, the cache controller records a row number of the associated entry in the reference table. Then, the cache controller adds an entry to the aging table for the moved cache line in the recorded row number, but counting up from a bottommost row of the aging table. However, in response to not finding the associated entry for the moved cache line in the reference table, the cache controller adds the associated entry for the moved cache line in an uppermost row of the aging table.

In response to moving the cache line from the storage location to the higher level cache, the cache controller adds the associated entry for the moved cache line in an uppermost row of the reference table. Subsequently, the cache controller does one of two things. In the first case, the cache controller removes an entry in the bottommost row of the reference table if no cache line was evicted from the higher level cache at a time when the moved cache line was added to the higher level cache. In the second case, the cache controller removes an entry corresponding to a cache line that was evicted from the higher level cache to make space for the moved cache line in the higher level cache. Then, the cache controller increments all other previously existing entries in the reference table by one.

In response to moving the cache line from the cache to the higher level cache, the cache controller removes the associated entry for the target cache line from the aging table and adds the associated entry for the target cache line in an uppermost row of the reference table. The reference table lists references to each new cache line received by the higher level cache, and entries for each new cache line are added to the uppermost row of the reference table. The aging table is a "past usage" history of cache lines in the higher level cache. Entries for evicted cache lines from the higher level cache are listed based on how long each cache line stayed in the higher level cache. The reference table may, for example, be located in the higher level cache and the aging table may, for example, be located in the cache. Alternatively, both the reference table and the aging table may be located in the cache.

Typically, current data processing systems include two or three levels of cache hierarchy. In this cache hierarchy, a lower level cache may act as a victim cache for a higher level cache. For example, the L3 cache may serve as a victim cache for the L2 cache. A victim cache is a cache that is used to hold cache lines that are removed, or evicted, from another cache. A problem with the victim cache design is that when a cache line is brought into the L2 cache and eventually evicted from the L2 cache, that cache line is placed in the L3 cache before being cast out to main memory. When an application streams through data bringing in a set of cache lines that the processor accesses just once, this data streaming may perturb the working cache line set, or footprint, of the application.

As a large number of cache lines are moved from the L2 cache to the L3 cache and then finally to main memory, this large number of cache lines may displace the useful footprint of the application in the L2 cache and the L3 cache. Because the L3 cache is functioning as a victim cache for the L2 cache, illustrative embodiments work to retain the application's footprint in the L3 cache to improve the data processing system's overall performance level by decreasing the amount of time required to access the necessary data. Illustrative embodiments are able to retain the application's footprint by recognizing that the application's footprint was in the L2 cache for a longer period of time before being evicted from the L2 cache into the L3 cache and that the streaming data was referenced just once before being evicted from the L2 cache. As a result, illustrative embodiments first evict cache lines from the L3 cache that are only referenced once. Thus, illustrative embodiments enable an application's footprint to live longer in the L3 cache.

Illustrative embodiments track or record the amount of time a cache line spends in the L2 cache. Further, based on the amount of time the cache line spent in the L2 cache, illustrative embodiments influence the amount of time the cache line spends in the L3 cache. In this way, illustrative embodiments tie past usage history of a cache line in the L2 cache to the time the cache line lives in the L3 cache.

Figure 3:
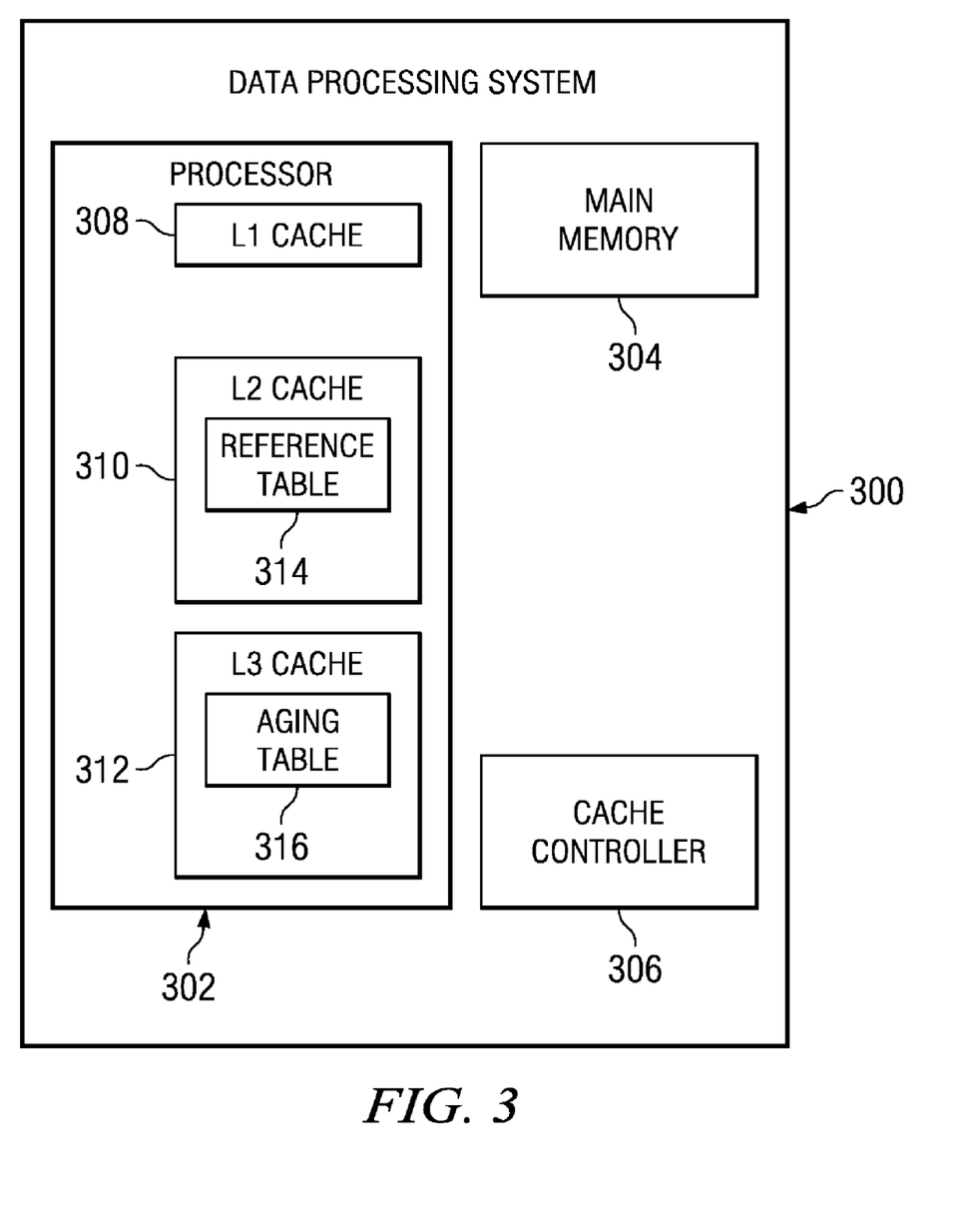
FIG. 3 is a block diagram illustrating components of a data processing system in accordance with an illustrative embodiment.

With reference now to FIG. 3, a block diagram illustrating components of a data processing system is depicted in accordance with an illustrative embodiment. Data processing system 300 may, for example, be implemented in data processing system 200 in FIG. 2. Data processing system 300 is a system for managing data in a plurality of caches.

Data processing system 300 includes processor 302, main memory 304, and cache controller 306. Processor 302 may, for example, be processing unit 206 in FIG. 2. Also, processor 302 may represent a plurality of processors. Processor 302 provides the data processing capabilities for data processing system 300.

In this particular example of FIG. 3, processor 302 includes L1 cache 308, L2 cache 310, and L3 cache 312. However, it should be noted that processor 302 may include more or fewer hierarchical memory caches. For example, processor 302 may only include L1 cache 308 or may include both L1 cache 308 and L2 cache 310. However, L3 cache 312 may, for example, be located external to processor 302 on a motherboard for data processing system 300.

Processor 302 processes data accessed from memory locations, such as L1 cache 308, L2 cache 310, L3 cache 312, and main memory 304. Main memory 304 may, for example, be main memory 208 in FIG. 2. In addition, main memory 304 may represent a plurality of memory devices. Main memory 304 is volatile memory, such as random access memory (RAM) and may hold data obtained from, for example, a ROM, an HDD, or a CD-ROM, such as ROM 224, HDD 226, and CD-ROM 230 in FIG. 2.

L1 cache 308 may, for example, be one or more registers built into processor 302. L1 cache 308 feeds data to processor 302 for processing. L2 cache 310 is a secondary cache that feeds data to L1 cache 308. L3 cache 312 feeds data to L2 cache 310. In addition, main memory 304 feeds data to L2 cache 310. Further, L3 cache 312 serves as a victim cache for L2 cache 310. Furthermore, as cache lines are evicted from L3 cache 312, the data from those evicted cache lines is returned to main memory 304.

L2 cache 310 includes reference table 314. Reference table 314 is a table that lists references to each new cache line received by L2 cache 310. Reference table 314 lists a new cache line entry in the uppermost row or on top of the list. However, it should be noted that when a cache line is evicted from L2 cache 310, the evicted cache line's entry is also evicted from reference table 314 at the same time.

L3 cache 312 includes aging table 316. Aging table 316 is a table that lists entries for evicted cache lines from L2 cache 310 based on age or how long each cache line stayed in L2 cache 310. In other words, aging table 316 is a past usage history of cache lines in L2 cache 310.

It should be noted that even though reference table 314 and aging table 316 are shown in L2 cache 310 and L3 cache 312, respectively, illustrative embodiments are not limited to such. For example, illustrative embodiments may include both reference table 314 and aging table 316 in either L2 cache 310 or L3 cache 312. Alternatively, illustrative embodiments may include reference table 314 and aging table 316 in one or more independent caches, main memory, or any other storage location that accommodates processes of illustrative embodiments.

Cache controller 306 is a component that includes one or more algorithms, such as, for example, a cache controller algorithm, an LRU algorithm, and a look-ahead algorithm, for controlling data flow between L1 cache 308, L2 cache 310, L3 cache 312, and main memory 304. Cache controller 306 may be implemented entirely as software, entirely as hardware, or as a combination of both software and hardware. Further, a user, such as a system administrator, may enable or disable cache controller 306 independently of other data processing system 300 components and features.

When processor 302 needs data from main memory 304, cache controller 306 fetches the needed cache line and places it in L2 cache 310. If the processor does not reference that cache line for a predetermined amount of time, cache controller 306 may use, for example, the LRU algorithm to evict that cache line from L2 cache 310 to L3 cache 312. The predetermined amount of time may, for example, be set by the system administrator. If processor 302 needs that cache line again, then cache controller 306 moves that cache line back into L2 cache 310 from L3 cache 312. On the other hand, if that cache line is not referenced in L3 cache 312 and does not have an associated entry in aging table 316, then cache controller 306 evicts that cache line out of L3 cache 312 back into main memory 304.

However, it should be noted that cache controller 306 ranks each cache line, which cache controller 306 moves into L3 cache 312, in aging table 316 based on the cache line's usage in L2 cache 310. To accomplish this ranking task, cache controller 306 utilizes reference table 314. This ranking process for each cache line in aging table 316 by illustrative embodiments preserves a once hot cache line's life in L3 cache 312 longer than only utilizing a LRU algorithm for evicting cache lines from L3 cache 312.

Figure 4:
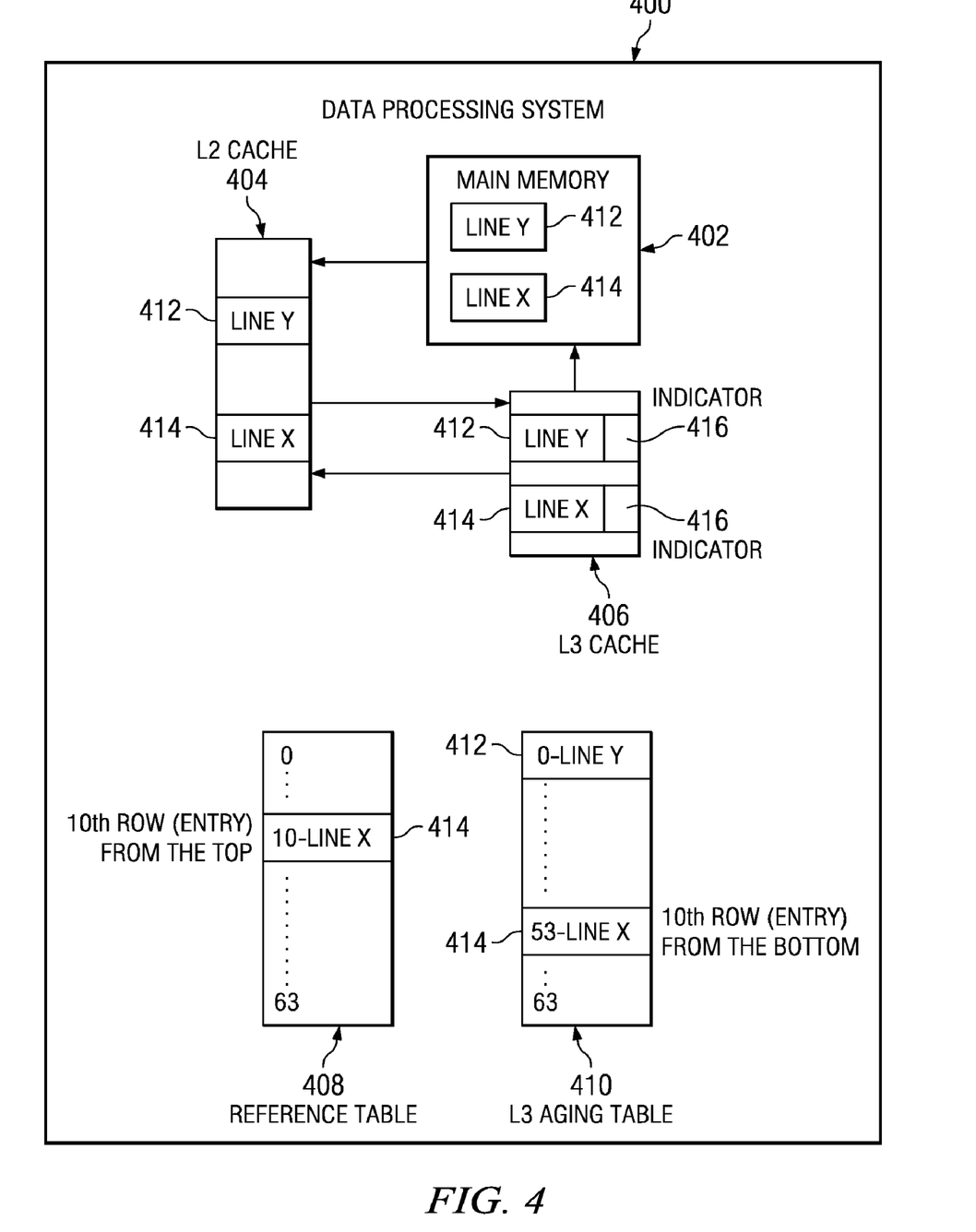
FIG. 4 is an exemplary illustration of data movement between a plurality of storage locations within a data processing system in accordance with an illustrative embodiment.

With reference now to FIG. 4, an exemplary illustration of data movement between a plurality of storage locations within a data processing system is depicted in accordance with an illustrative embodiment. Data processing system 400 may, for example, be implemented in data processing system 300 in FIG. 3. Data processing system 400 includes main memory 402, L2 cache 404, L3 cache 406, reference table 408, and L3 aging table 410, such as, for example, main memory 304, L2 cache 310, L3 cache 312, reference table 314, and aging table 316 in FIG. 3.

Reference table 408 and L3 aging table 410 may both contain the same number of rows for data entries. In this particular example of FIG. 4, reference table 408 and L3 aging table 410 include sixty-four rows, zero through sixty-three. However, illustrative embodiments are not limited to such. Illustrative embodiments may include more or fewer rows for entries within reference table 408 and L3 aging table 410.

When a cache controller, such as, for example, cache controller 306 in FIG. 3, fetches a cache line, such as cache line Y 412 or cache line X 414, from main memory 402 and then places that cache line in L2 cache 404, the cache controller makes a corresponding entry for that new cache line in the uppermost row, or row zero, of reference table 408. As the cache controller inserts the entry for the new cache line in row zero of reference table 408, the cache controller concurrently evicts the last entry in the sixty-third row from reference table 408. Thus, every time the cache controller adds a new cache line to L2 cache 404 and inserts an associated entry in reference table 408, the cache controller concurrently moves the existing entries in reference table 408 down one row until an existing entry is pushed out of the bottommost row of reference table 408.

Now, when the cache controller evicts a cache line from L2 cache 404 and places that evicted cache line into L3 cache 406, the cache controller searches for an associated entry for that evicted cache line in reference table 408. For example, the cache controller eventually evicts cache line Y 412 and cache line X 414 from L2 cache 404 and places these evicted cache lines into L3 cache 406. Then, the cache controller searches for an associated entry for these evicted cache lines in reference table 408.

At this point, two scenarios exist. In the first scenario, the cache controller does not find an associated entry for evicted cache line Y 412 in reference table 408. Not finding the associated entry for evicted cache line Y 412 in reference table 408 means that cache line Y 412 spent enough time in L2 cache 404 for the associated entry to be pushed out of the bottom of reference table 408 after reaching row sixty-three. As a result of not finding the corresponding entry for evicted cache line Y 412 in reference table 408, the cache controller inserts an entry for cache line Y 412 in L3 aging table 410 in the uppermost row or row zero, which is the sixty-fourth entry from the bottom. In other words, an entry placed at the top of L3 aging table 410 equals the longest possible life expectancy, or time, in L3 aging table 410.

In the second scenario, the cache controller does find a corresponding entry for evicted cache line X 414 in reference table 408. After finding the corresponding entry for evicted cache line X 414 in reference table 408, the cache controller records the position, or row number, of that entry from the top of reference table 408. Subsequently, the cache controller copies the corresponding entry for cache line X 414 from reference table 408 to L3 aging table 410 in the same row position, but counting up from the bottommost row of L3 aging table 410. For example, the corresponding entry for evicted cache line X 414 is in the tenth row from the top in reference table 408. Consequently, the cache controller copies the corresponding entry for cache line X 414 into the tenth row from the bottom of L3 aging table 410.

Each time the cache controller inserts a new entry into L3 aging table 410, the entry in the bottommost row is thrown out. As long as an associated entry for a cache line is present within L3 aging table 410, the cache controller does not consider that cache line for removal from L3 cache 406. Illustrative embodiments may achieve this by, for example, placing indicator 416, which may be enabled and disabled or turned on and off, on cache line Y 412 and cache line X 414. Indicator 416 may, for example, be a special bit. If indicator 416 is enabled on a cache line, then the cache controller will not consider that for removal from L3 cache 406. On the other hand, if indicator 416 is disabled on a cache line, then the cache line controller will consider that cache line for removal from L3 cache 406.

Therefore, illustrative embodiments achieve preferential treatment of cache lines that spend more time in L2 cache 404. Illustrative embodiments provide this preferential treatment to cache lines that spend more time in L2 cache 404 because a processor, such as, for example, processor 302 in FIG. 3, may very well need these cache lines again after being moved to L3 cache 406, which has a higher capacity for storage than L2 cache 404.

Thus, it should be appreciated by those of ordinary skill in the art that it is not efficient to treat all cache lines the same because some cache lines are only used once and then are thrown out, while others are frequently used. Illustrative embodiments ensure that those frequently used cache lines are kept close to L2 cache 404 for faster access. Also, it should be appreciated by those of ordinary skill in the art that illustrative embodiments may also be easily applied to all levels of memory or storage hierarchy.

Figure 5:
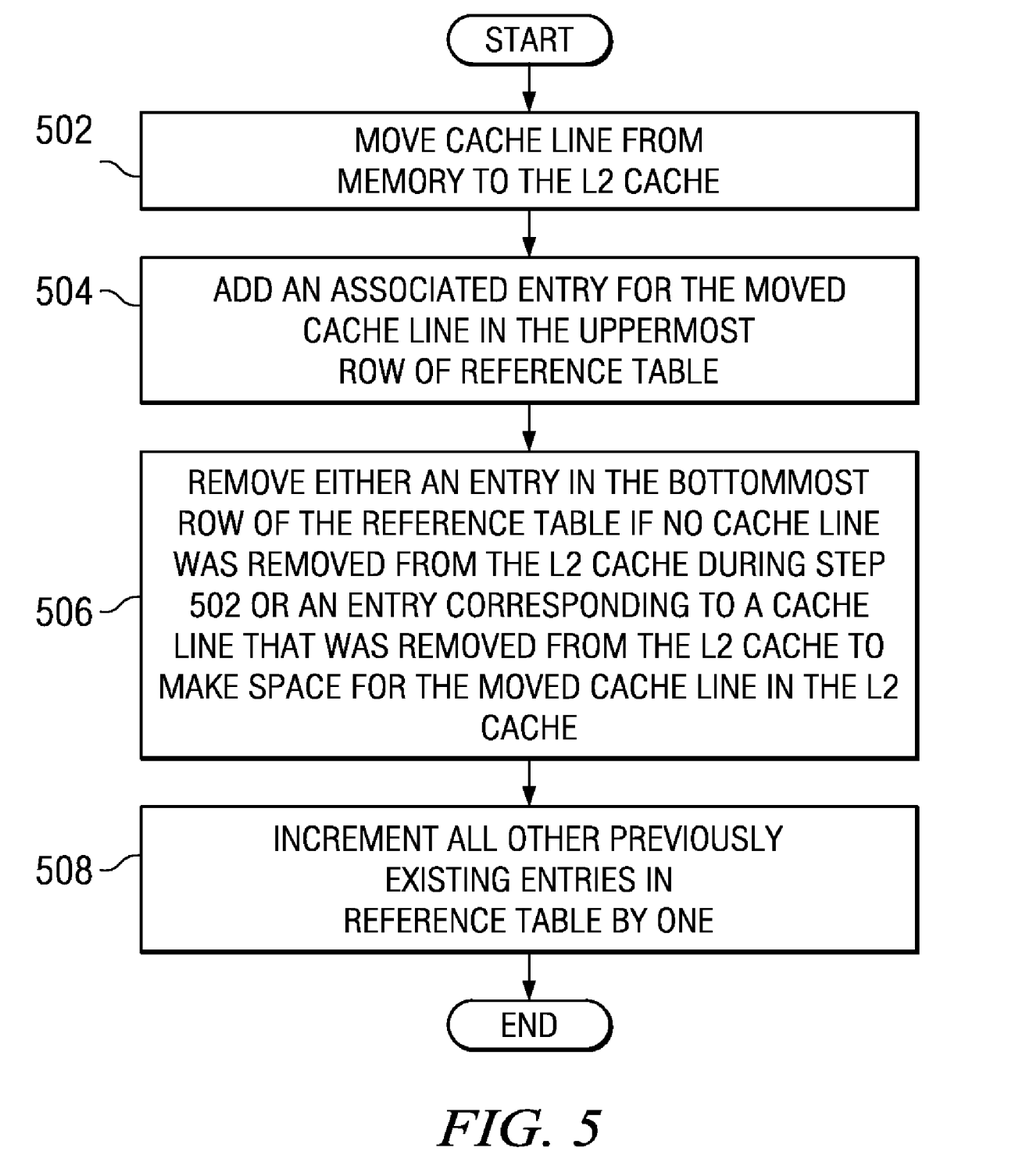
FIG. 5 is a flowchart illustrating an exemplary process for moving data from memory to an L2 cache in accordance with an illustrative embodiment.

With reference now to FIG. 5, a flowchart illustrating an exemplary process for moving data from memory to an L2 cache is shown in accordance with an illustrative embodiment. The process shown in FIG. 5 may be implemented in a cache controller, such as, for example, cache controller 306 in FIG. 3.

The process begins when the cache controller moves a cache line from memory to an L2 cache (step 502). For example, the cache controller moves cache line Y 412 from main memory 402 to L2 cache 404 in FIG. 4. After moving the cache line from memory to the L2 cache in step 502, the cache controller adds an associated entry for the moved cache line in the uppermost row of a reference table, such as, for example, reference table 408 in FIG. 4 (step 504). Then, the cache controller removes either an entry in the bottommost row of the reference table if no cache line was removed from the L2 cache during step 502 or an entry corresponding to a cache line that was removed from the L2 cache to make space for the moved cache line in the L2 cache (step 506).

Afterward, the cache controller increments all other previously existing entries in the reference table by one (step 508). In other words, all other previously existing entries move down one row in the reference table. The process terminates thereafter.

However, it should be noted that even though the described steps above are in a sequential order, illustrative embodiments are not limited to such. Illustrative embodiments may, for example, concurrently perform two or more of the steps above at a same time.

Figure 6:
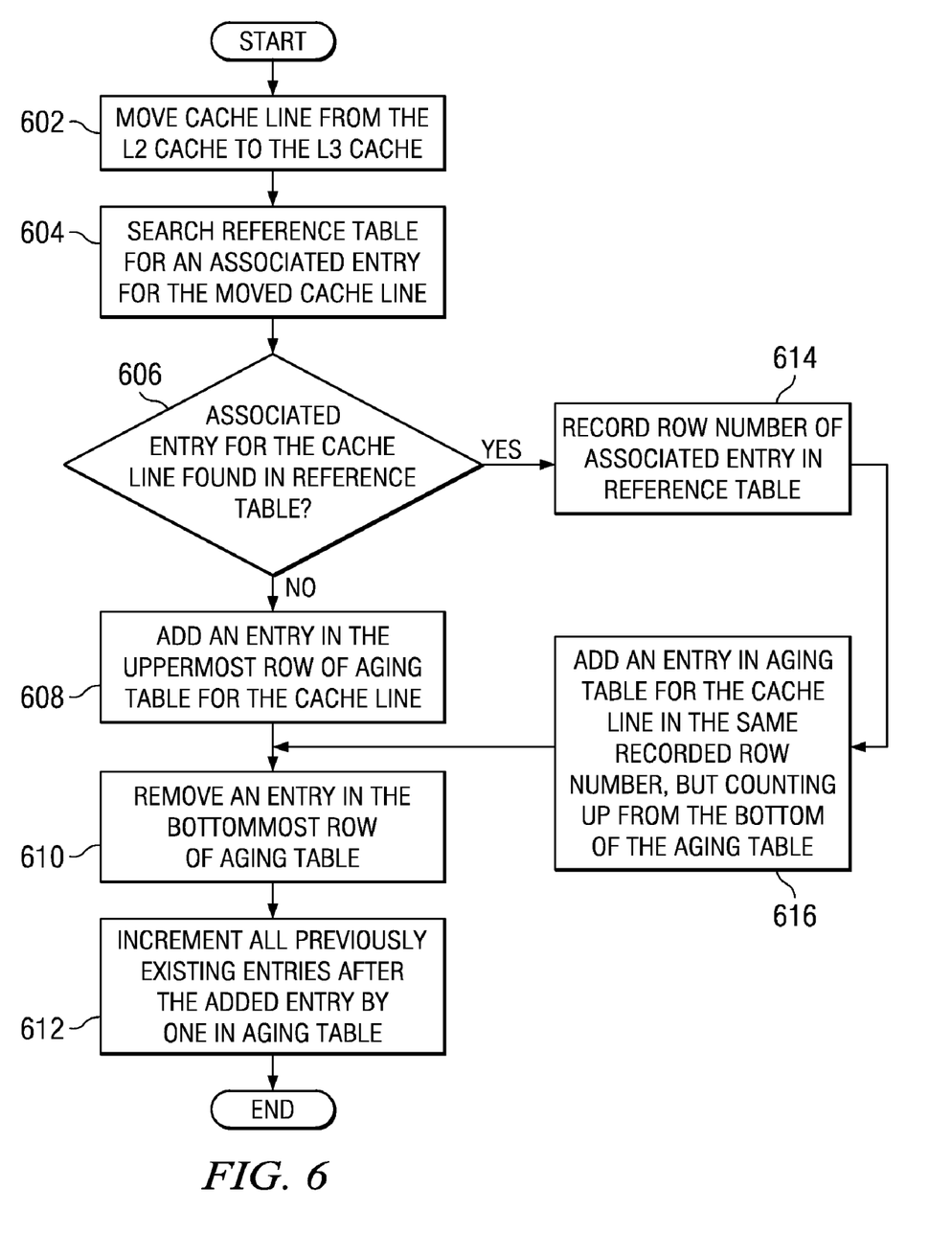
FIG. 6 is a flowchart illustrating an exemplary process for moving data from an L2 cache to an L3 cache in accordance with an illustrative embodiment.

With reference now to FIG. 6, a flowchart illustrating an exemplary process for moving data from an L2 cache to an L3 cache is shown in accordance with an illustrative embodiment. The process shown in FIG. 6 may be implemented in a cache controller, such as, for example, cache controller 306 in FIG. 3.

The process begins when the cache controller moves a cache line from an L2 cache to an L3 cache (step 602). For example, the cache controller moves cache line Y 412 from L2 cache 404 to L3 cache 406 in FIG. 4. Then, the cache controller searches a reference table, such as, for example, reference table 408 in FIG. 4, for an associated entry for the moved cache line (step 604). Afterward, the cache controller makes a determination as to whether the cache controller found an associated entry for the moved cache line in the reference table (step 606).

If the cache controller did not find an associated entry for the moved cache line in the reference table, no output of step 606, then the cache controller adds an entry in the uppermost row of an aging table, such as, for example, L3 aging table 410 in FIG. 4, for the moved cache line (step 608). Subsequently, the cache controller removes an entry in the bottommost row of the aging table (step 610). Then, the cache controller increments all previously existing entries after the added entry by one in the aging table (step 612). The process terminates thereafter.

Returning again to step 606, if the cache controller did find an associated entry for the moved cache line in the reference table, yes output of step 606, then the cache controller records a row number of the associated entry in the reference table (step 614). After recording the row number of the associated entry in the reference table in step 614, the cache controller adds an entry in the aging table for the moved cache line in the same recorded row number, but counting up from the bottommost row of the aging table (step 616). Thereafter, the process returns to step 610.

It should be noted that even though the steps described above are in a sequential order, illustrative embodiments are not limited to such. Illustrative embodiments may, for example, concurrently perform two or more of the steps above at a same time.

Figure 7:
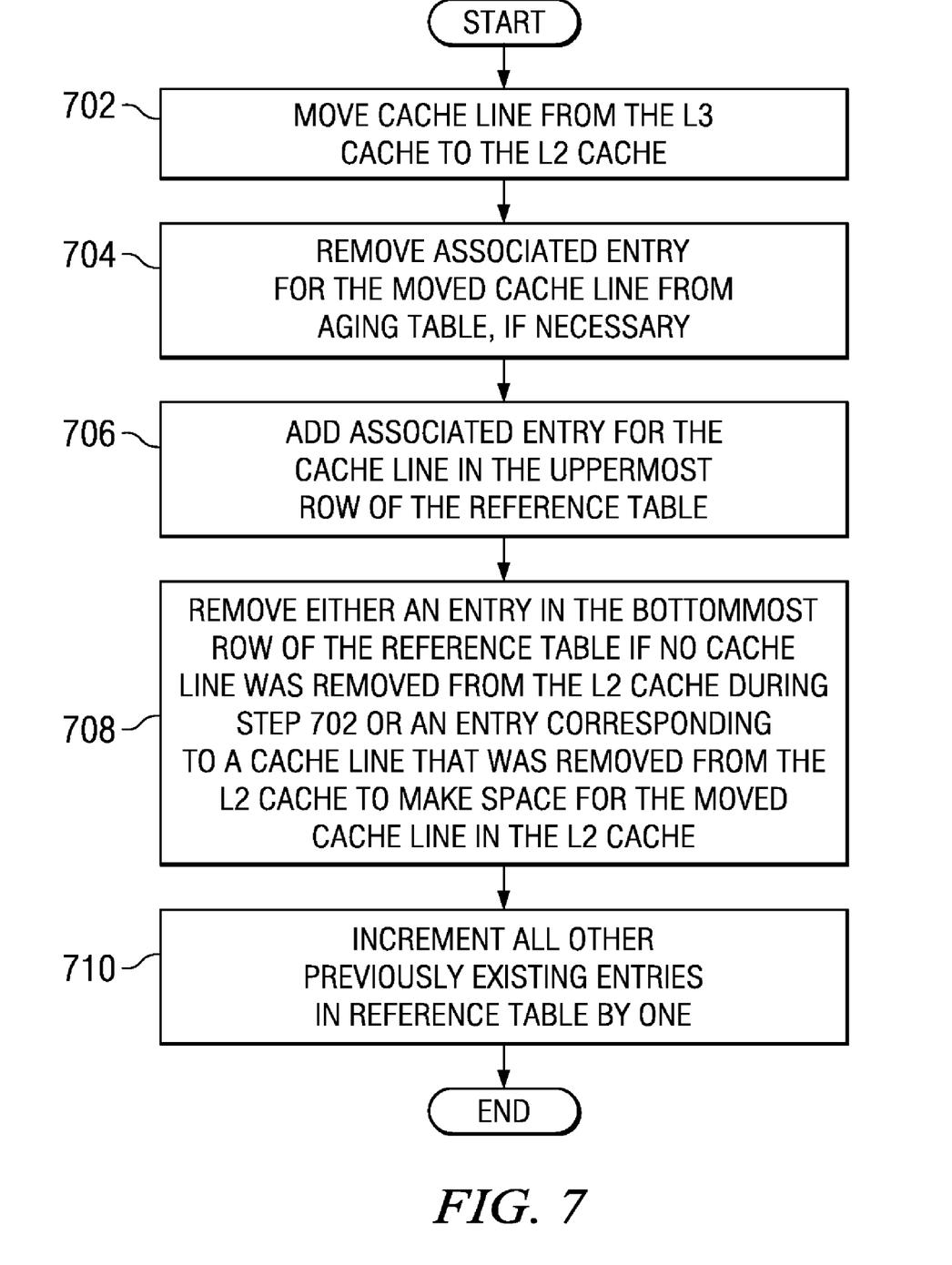
FIG. 7 is a flowchart illustrating an exemplary process for moving data from an L3 cache to an L2 cache in accordance with an illustrative embodiment.

With reference now to FIG. 7, a flowchart illustrating an exemplary process for moving data from an L3 cache to an L2 cache is shown in accordance with an illustrative embodiment. The process shown in FIG. 7 may be implemented in a cache controller, such as, for example, cache controller 306 in FIG. 3.

The process begins when the cache controller moves a cache line from an L3 cache to an L2 cache (step 702). For example, the cache controller moves cache line Y 412 from L3 cache 406 to L2 cache 404 in FIG. 4. Then, the cache controller removes an associated entry for the moved cache line from an aging table, such as, for example, L3 aging table 410 in FIG. 4, if necessary (step 704). In addition, the cache controller adds an associated entry for the moved cache line in the uppermost row of a reference table, such as, for example, reference table 408 in FIG. 4 (step 706). Subsequently, the cache controller removes either an entry in the bottommost row of the reference table if no cache line was removed from the L2 cache during step 702 or an entry corresponding to a cache line that was removed from the L2 cache to make space for the moved cache line in the L2 cache (step 708).

Afterward, the cache controller increments all other previously existing entries in the reference table by one (step 710). The process terminates thereafter. However, it should be noted that even though the described steps above are in a sequential order, illustrative embodiments are not limited to such. Illustrative embodiments may, for example, concurrently perform two or more of the steps above at a same time.

Figure 8:
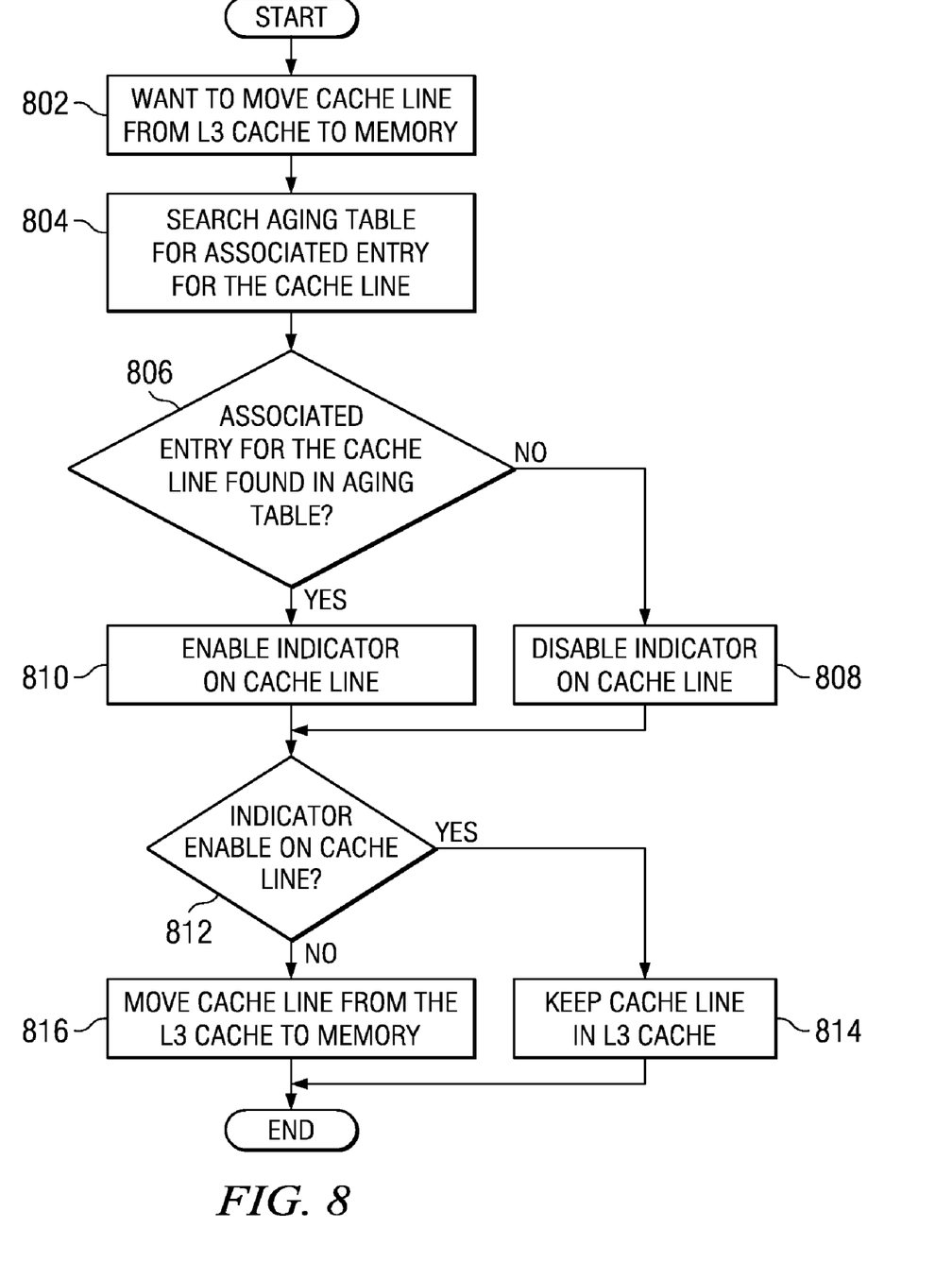
FIG. 8 is a flowchart illustrating an exemplary process for moving data from an L3 cache to memory in accordance with an illustrative embodiment.

With reference now to FIG. 8, a flowchart illustrating an exemplary process for moving data from an L3 cache to memory is shown in accordance with an illustrative embodiment. The process shown in FIG. 8 may be implemented in a cache controller, such as, for example, cache controller 306 in FIG. 3.

The process begins when an LRU algorithm in the cache controller wants to move a cache line from an L3 cache to memory (step 802). For example, the LRU algorithm wants to move cache line Y 412 from L3 cache 406 to main memory 402 in FIG. 4. Subsequently, the cache controller searches an aging table, such as, for example, L3 aging table 410 in FIG. 4, for an associated entry for the cache line (step 804). After searching the aging table for an associated entry for the cache line in step 804, the cache controller makes a determination as to whether the cache controller found an associated entry for the cache line in the aging table (step 806).

If the cache controller did not find an associated entry for the cache line in the aging table, no output of step 806, then the cache controller disables an indicator, such as, for example, indicator 416 in FIG. 4, on the cache line (step 808). Thereafter, the process proceeds to step 812. If the cache controller did find an associated entry for the cache line in the aging table, yes output of step 806, then the cache controller enables the indicator on the cache line (step 810).

Then, the cache controller makes a determination as to whether the indicator is enabled on the cache line (step 812). If the indicator is enabled on the cache line, yes output of step 812, then the cache controller keeps the cache line in the L3 cache despite the LRU algorithm wanting to move the cache line out of the L3 cache to memory (step 814). The process terminates thereafter. If the indicator is not enabled on the cache line, no output of step 812, then the cache controller moves the cache line from the L3 cache to memory (step 816). The process terminates thereafter.

Thus, illustrative embodiments provide a computer implemented method, system, and computer usable program code for managing data in a plurality of storage locations using upper cache history information to improve lower cache data replacement. The invention may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer-readable medium may be any tangible apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a ROM, a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, et cetera) may be coupled to the system either directly or through intervening I/O controllers.

Network adapters also may be coupled to the system to enable the data processing system to become coupled to other data processing systems, remote printers, or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing data in a plurality of storage locations, the computer implemented method comprising:

responsive to a least recently used algorithm wanting to move data from a cache to a storage location, searching an aging table for an associated entry for the data;

responsive to finding the associated entry for the data in the aging table, enabling an indicator on the data; and responsive to determining that the indicator is enabled on the data, keeping the data in the cache despite the least recently used algorithm wanting to move the data to the storage location.

2. The computer implemented method of claim 1, further comprising:

responsive to determining that the indicator is disabled on the data, moving the data from the cache to the storage location.

3. The computer implemented method of claim 1, further comprising:

responsive to moving the data from a higher level cache to the cache to form moved data, searching a reference table for an associated entry for the moved data;

responsive to finding the associated entry for the moved data in the reference table, recording a row number of the associated entry in the reference table to form a recorded row number; and adding an entry to the aging table for the moved data in the recorded row number counting up from a bottommost row of the aging table.

4. The computer implemented method of claim 3, further comprising:

responsive to not finding the associated entry for the moved data in the reference table, adding the associated entry for the moved data in an uppermost row of the aging table.

5. The computer implemented method of claim 3, further comprising:

responsive to moving the data from the storage location to the higher level cache, adding the associated entry for the moved data in an uppermost row of the reference table;

removing either an entry in the bottommost row of the reference table if no data was evicted from the higher level cache at a time when the moved data was added to the higher level cache or an entry corresponding to data that was evicted from the higher level cache to make space for the moved data in the higher level cache; and incrementing all other previously existing entries in the reference table by one.

6. The computer implemented method of claim 3, further comprising:

responsive to moving the data from the cache to the higher level cache, removing the associated entry for the moved data from the aging table; and adding the associated entry for the moved data in an uppermost row of the reference table.

7. The computer implemented method of claim 1, wherein the data is a cache line.

8. The computer implemented method of claim 1, wherein the storage location is a lower level cache.

9. The computer implemented method of claim 7, wherein the storage location is a main memory.

10. The computer implemented method of claim 1, wherein the indicator is a special bit on the cache line.

11. The computer implemented method of claim 6, wherein the reference table lists references to each new data received by the higher level cache, and wherein entries for the each new data received by the higher level cache are added to the uppermost row of the reference table.

12. The computer implemented method of claim 1, wherein the aging table is a past usage history of the data in the higher level cache, and wherein entries for evicted data from the higher level cache are listed based on how long each cache line stayed in the higher level cache.

13. The computer implemented method of claim 3, wherein the reference table is located in the higher level cache, and wherein the aging table is located in the cache.

14. The computer implemented method of claim 3, wherein the reference table and the aging table are located in the cache.

15. The computer implemented method of claim 6, wherein the searching, enabling, keeping, moving, recording, adding, removing, and incrementing steps are performed by a cache controller.

16. A data processing system for managing data in a plurality of storage locations, comprising:
   a bus system;
   a storage device connected to the bus system, wherein the storage device includes a set of instructions; and
   a processing unit connected to the bus system, wherein the processing unit executes the set of instructions to search an aging table for an associated entry for data in response to a least recently used algorithm wanting to move the data from a cache to a storage location, enable an indicator on the data in response to finding the associated entry for the data in the aging table, and keep the data in the cache despite the least recently used algorithm wanting to move the data to the storage location in response to determining that the indicator is enabled on the data.

17. A computer program product for managing data in a plurality of storage locations, the computer program product comprising:
   a computer usable medium having computer usable program code embodied therein, the computer usable medium comprising:
   computer usable program code configured to search an aging table for an associated entry for data in response to a least recently used algorithm wanting to move the data from a cache to a storage location;
   computer usable program code configured to enable an indicator on the data in response to finding the associated entry for the data in the aging table; and
   computer usable program code configured to keep the data in the cache despite the least recently used algorithm wanting to move the data to the storage location in response to determining that the indicator is enabled on the data.

18. The computer program product of claim 17, further comprising:
   computer usable program code configured to move the data from the cache to the storage location in response to determining that the indicator is disabled on the data.

19. The computer program product of claim 17, further comprising:
   computer usable program code configured to search a reference table for an associated entry for moved data in responsive to moving the data from a higher level cache to the cache to form the moved data;
   computer usable program code configured to record a row number of the associated entry in the reference table to form a recorded row number in response to finding the associated entry for the moved data in the reference table; and
   computer usable program code configured to add an entry to the aging table for the moved data in the recorded row number counting up from a bottommost row of the aging table.

20. The computer program product of claim 19, further comprising:
   computer usable program code configured to add the associated entry for the moved data in an uppermost row of the aging table in response to not finding the associated entry for the moved data in the reference table.

* * * * *